(12) United States Patent
Robins

(10) Patent No.: US 7,186,048 B2
(45) Date of Patent: Mar. 6, 2007

(54) QUICK RELEASE MECHANISM

(76) Inventor: Troy L. Robins, 6910 N. Bales, Apt. 312, Gladstone, MO (US) 64119

( * ) Notice: Subject to any disclaimer, the term of this patent is extended or adjusted under 35 U.S.C. 154(b) by 61 days.

(21) Appl. No.: 10/754,958

(22) Filed: Jan. 9, 2004

(65) Prior Publication Data

US 2005/0152740 A1    Jul. 14, 2005

(51) Int. Cl.
 *F16B 7/10* (2006.01)
 *B25B 23/16* (2006.01)
(52) U.S. Cl. ............... 403/109.3; 403/109.5; 403/109.7; 403/322.4; 403/324; 403/325; 81/177.2
(58) Field of Classification Search .. 403/109.1–109.7, 403/321–325; 81/177.2; 292/32, 152, 163, 292/164, 150, DIG. 37, DIG. 61, DIG. 63
See application file for complete search history.

(56) References Cited

U.S. PATENT DOCUMENTS

| | | | | | |
|---|---|---|---|---|---|
| 1,370,820 | A | * | 3/1921 | Johnson | .................... 81/177.2 |
| 1,753,441 | A | * | 4/1930 | Morehouse | ................. 81/177.2 |
| 4,303,266 | A | * | 12/1981 | Volpi | .................... 292/DIG. 15 |
| 4,409,866 | A | * | 10/1983 | McBride | ..................... 81/177.2 |
| 4,905,548 | A | * | 3/1990 | Colace et al. | .............. 81/177.2 |
| 5,154,104 | A | * | 10/1992 | O | .............................. 81/177.2 |
| 5,931,065 | A | * | 8/1999 | Jackson et al. | ............ 81/177.2 |
| 5,975,592 | A | * | 11/1999 | Lin | .............................. 292/37 |

* cited by examiner

*Primary Examiner*—Daniel P. Stodola
*Assistant Examiner*—Victor MacArthur
(74) *Attorney, Agent, or Firm*—Chase Law Firm, L.C.

(57) ABSTRACT

A latching mechanism for coupling nestable drive shanks of a tool includes a housing presenting a locking pin movable between a normal locking position and a release position. First and second bias means cooperate to urge a free end of the locking pin in extension outside the housing so as to extend between aligned shank apertures and join the same. Upon user disengagement of one bias means on the locking pin, the locking pin is urged to a release position towards a location within the housing so as to withdraw the pin from the aligned apertures. The latching mechanism enables drive shanks to be connected at user selectable lengths therebetween.

7 Claims, 3 Drawing Sheets

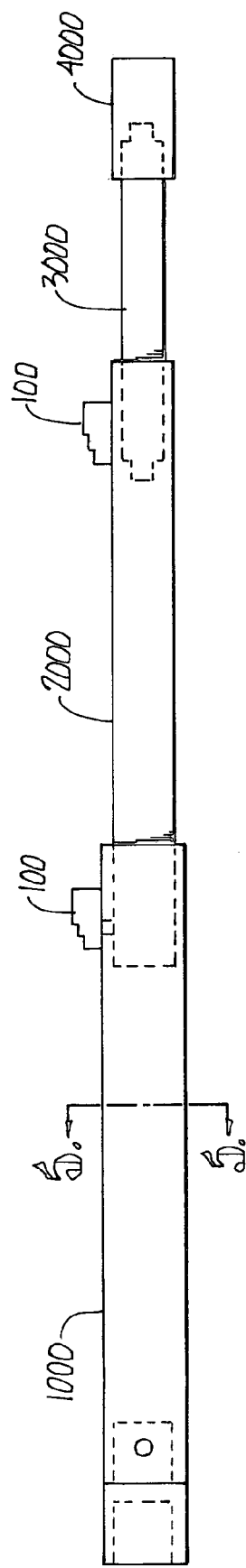
Fig. 1
Fig. 2
Fig. 3
Fig. 4

QUICK RELEASE MECHANISM

BACKGROUND OF THE INVENTION

This invention relates generally to tools and, more particularly, to latching mechanisms for quickly engaging and releasing the shanks of tools to provide a telescopic function thereto.

Various tools are known which releasably retain a socket at one end of a drive shank. In connection therewith I provide various latching mechanisms which enable shanks to be positively engaged and/or released at relative longitudinal relationships therebetween. Accordingly, the drive shank length of the tool can be variably extended according to the job at hand. As such there is no need to purchase a plurality of variously sized shanks as the telescopic shanks can be selectably extended.

SUMMARY OF THE INVENTION

My invention is herein disclosed in the form of three now preferred latching mechanisms which utilize a locking pin reciprocative between locking and release positions. A latching mechanism is positioned adjacent one exterior shank so that the locking pin extends through aligned shank apertures of first and second nestable shanks. Accordingly, upon the shank apertures being selectably aligned, the locking pin extension therethrough locks the shanks in place at a relative longitudinal displacement therebetween. My latching mechanism is user operable so as to move the locking pin to a release position so as to withdraw the locking pin from the aligned shank apertures. Thus, the nested shanks can be displaced one from the other.

It is therefore a general object of this invention to provide a latching mechanism which easily engages one drive shank of a tool nested with another nested therein.

Another object of this invention is to provide a latching mechanism, as aforesaid, having a locking pin biased into a locking extension through aligned apertures of the nested shanks.

Still another object of this invention is to provide a latching mechanism, as aforesaid, which can be permanently or releasably attached to one of the drive shanks.

A still further object of this invention is to provide a latching mechanism, as aforesaid, which presents a user-manipulated trigger which moves the locking pin of the latching mechanism from its locking position.

A particular object of this invention is to provide spring biases in said latching mechanism which biases the locking pin and/or trigger of the latching mechanism into desired positions for achieving either locking or release positions.

A more particular object of this invention is to provide a latching mechanism with trigger, as aforesaid, the trigger being biased into a position which urges the locking pin into a normal locking position.

Another particular object of this invention is to provide a trigger, as aforesaid, wherein the trigger is user operable to a position allowing the locking pin to move to a release position.

Other objects and advantages of this invention will become apparent from the following description taken in connection with the accompanying drawings, wherein is set forth by way of illustration and example, now preferred embodiments of this invention.

BRIEF DESCRIPTION OF THE DRAWINGS

FIG. 1 is a diagrammatic view showing the use of two latching mechanisms for connecting three nested shanks in selectable extension therebetween;

FIG. 2 is a diagrammatic view showing the extension of a locking pin through an aperture in the exterior shank;

FIG. 3 is a diagrammatic view showing an interior shank designed for nesting in an exterior shank with a plurality of apertures therealong;

FIG. 4 is a plan view showing an end drive shank with a plurality of apertures therein, one end for engaging a drive socket;

DESCRIPTION OF THE PREFERRED EMBODIMENT

Turning more particularly to the drawings, FIG. 1 shows a plurality of drive shanks 1000, 2000, 3000 nested one within the other with end shank 3000 engaging a drive socket assembly 4000 such as shown in FIGS. 6–12. Atop the shanks 1000, 2000 are one of my latching mechanisms 100, 200, 300 as to be subsequently described. Such latching mechanisms may be permanently affixed to the shanks or releasable therefrom. As such the shanks 1000, 2000, 3000 may be releasably connected one to the another in selected longitudinal extensions therebetween. This connection is provided by the extension of a locking pin of a respective latch mechanism 100, 200, 300 through aligned apertures of respectively nested first and second shanks.

As also shown in FIGS. 6–12 the free end of and shank 3000 may present various configurations so as to be engageable with various types of drive sockets 4000 or other structures for releasably engaging drive sockets. It is understood that my invention is directed to the latching mechanisms 100, 200, 300 for releasably attaching the drive shanks at selectable relationships therebetween.

Figure 5:
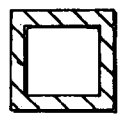
FIG. 5 is an end view of a drive shank.
Figure 6:
FIGS. 6–12 illustrate various configurations of sockets for engaging at one socket end the drive shank and at the other socket end a drive socket.
Figure 7:
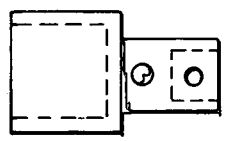
Figure 8:
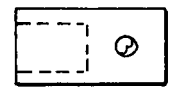
Figure 9:
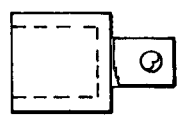
Figure 10:
Figure 11:
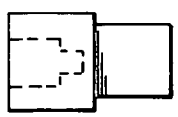
Figure 12:
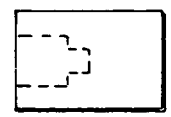
Figure 13:
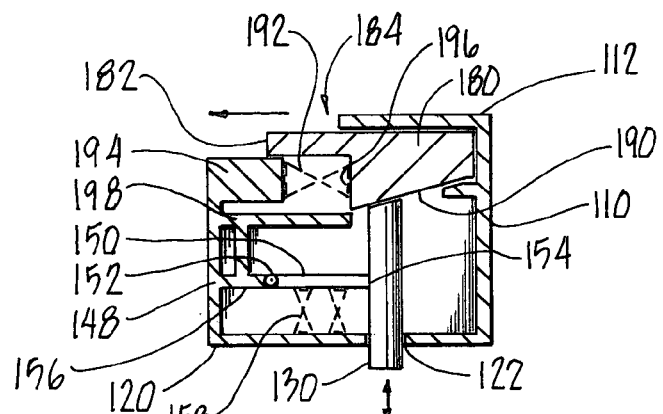
FIG. 13 is a central sectional view of a first latching mechanism with the locking pin being unsectioned.

Turning more particularly to FIG. 13, a first latching mechanism 100 is shown which includes a housing 110 having a configuration for placement along the exterior surface of a respective shank. The housing presents a bottom surface 120 preferably configured as to lie contiguous with the exterior surface of a shank. This bottom surface 120 of the housing 100 includes an aperture 122 for reciprocative extension of the locking pin 130 therethrough as to be subsequently described.

The interior of the housing 100 presents a flange 148 to which is mounted a pivot arm 150 having a first end 152 and a second end 154. First end 152 of arm 150 is pivotally mounted about pin 156 allowing the arm 150 to swing in either clockwise or counterclockwise directions. Movement of the pivot arm 150 is biased into a counterclockwise direction as provided by springs 158 extending to a normal position, the springs 158 positioned between the bottom wall 120 and this pivot arm 150. As the second end 154 of pivot arm 150 is attached to the locking pin 130, the movement of the spring 158 from a compressed towards its normal position urges the locking pin 130 into a counterclockwise direction (as viewed) so as to cause the free end of locking pin 130 to withdraw within/towards the interior of the housing 110.

Located at the top of the housing 110 is a slidable trigger/lever arm 180 in the form of a wedge having a sloped surface 190 which bears against the top end of locking pin 130. This wedge-like structure 180 is slidable within a slot 184 presented between walls 112, 194 of housing 110. Springs 192 extend between wall 194 and a wall 196 of the lever arm 180 such that the normal position of spring 192 biases the sloped surface 190 (right as viewed) along the top of locking pin 130 until the lowermost extension of surface 190 bears against the top of pin 130. As such the locking pin 190 is normally, downwardly urged, as viewed, into a locking position through the aperture 122 and without/outside the housing 110.

The lever arm 180 presents a free end 182 which allows the user to slide the lever arm to the left as viewed in FIG. 13 which compresses the spring 192. Slidable movement of arm 180 is aided by walls 112, 194, 198 of the housing 110 which cooperate to provide channels for the free end 182 and sloped surface 190 of lever arm 180. During this user movement, the bearing effect of the sloped surface 190 against pin 130 decreases which allows the top end of the locking pin 130 to move upwardly as aided by the return of the compressed spring 158 to its normal position. Accordingly, the locking pin 130 is urged towards a release position within the housing. Upon release of the operable end 182 of the lever arm 180 by the user, the return of compressed spring 192 to a normal position urges the sloped surface 190 of the lever arm 180 to the right, as viewed, such that the free end of locking pin 130 is depressed into the FIG. 13 locking position without the housing 110.

As such my assembly 100 provides first locking and second release positions of the locking pin 130 with the normal position of the locking pin being without the housing 110, i.e., in extension through the aperture 122 in the base 120 of the housing 110. This normal locking position of the locking pin 130 is changed as the user moves the lever arm 190 to the left as shown in FIG. 13 which allows the locking pin 130 to move to a second release position within the housing 110.

Accordingly, upon placement of the latching mechanism 100 upon the shank 1000 the normal position of the locking pin 130 is in extension between selectably aligned apertures 1002, 2002 of the first 1000 and second 2000 shanks. To unlock one shank from the other the locking pin is moved to its release position upon user movement of the trigger arm 180 to its release position.

Figure 14:
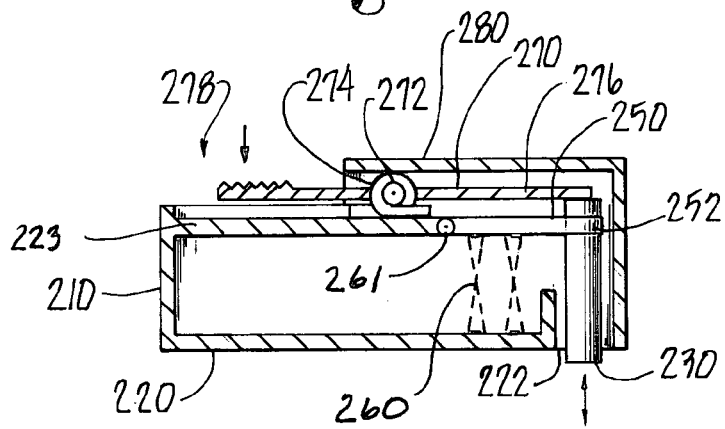
FIG. 14 is a central sectional view of a second latching mechanism with the locking pin being unsectioned.

FIG. 14 shows a second embodiment of my latching mechanism 200 as comprising a housing 210 with bottom surface 220 configured to lie contiguous atop a drive shank. An aperture 222 within surface 220 allows for extension of locking pin 230 therethrough.

Within housing 210 is a pivot arm 250 having one end mounted above pivot pin 261. The opposite end 252 of pivot arm 250 is connected to the locking pin 230. Springs 260 bias this pivot arm 250 in a counterclockwise direction so as to upwardly urge the connected pin 230 towards a position within the housing.

A locking pin arm 270 is mounted atop a wall 223 of housing about a pivot pin 272. A spring 274 urges an end 276 of arm into a clockwise direction so as to downwardly urge the pin 230 into extension without the housing 210. The bias of spring 274 overcomes the bias of springs 260 so as to urge the locking pin 230 in a normal locking position.

A free end 278 of the locking pin arm 270 is located between wall 223 and top wall 280 and extends outside the housing. Upon a user depression of this free end 278 of the locking pin arm 270 the opposed end 276 of the arm 270 is moved in a counterclockwise direction. Accordingly, the locking pin 230 upwardly moves within the housing as urged by the spring 260 bias.

In use the apertures of the respective shanks 1000, 2000 are aligned with the free end of the locking pin 230 being at a locking position in extension therethrough. Accordingly, the shanks 1000, 2000 are connected. Upon depression of the free end 278 of the locking pin arm 270 the locking pin 230 is released from the aligned apertures as biased into the housing 210 by springs 260. Thus, the respectively nested shanks are released.

Figure 15:
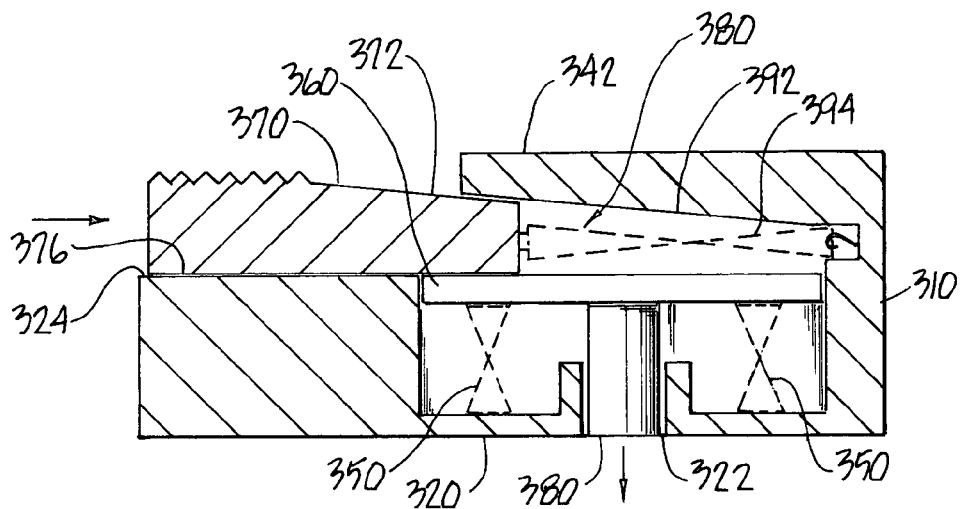
FIG. 15 is a central sectional view of a third latching mechanism with the locking pin being unsectioned.

FIG. 15 shows a third embodiment of my latching mechanism 300 presenting a housing 310 with aperture 322 in the bottom surface 320 thereof. A locking pin 250 within the housing is for extension through this aperture 322. A horizontal plate 360 is provided at the top end of pin 330. Springs 350 are positioned between the bottom surface 320 and underside of the plate 360 so as to bias the pin 330 towards a position within the housing.

A locking pin trigger arm 370 is adapted to slide within a slot 380 presented by surface 324 and the lower surface 392 of the upper wall 390 of the housing. The arm 370 presents a sloped surface 372 complimentary to the slope of surface 392 so as to present a wedge-like relationship therebetween. A spring 394 upon return to its normal position biases locking pin arm 370 into slot such that the bottom surface 376 of locking pin arm 370 normally bears atop the plate 360. (FIG. 15 shows the arm only partially returned to its normal position within slot 380.) It is understood that the position of arm 370 within slot 380 can be adjusted according to the bias of spring 394. Thus, the locking pin arm 370 overcomes the bias of springs 350 so as to normally urge the free end of locking pin 330 into a locking position without/exterior of housing 310 as arm 370 moves farther into slot 380.

Upon user movement of the locking pin arm 370 to the left, as viewed, the arm 370 is displaced from a bearing position atop the locking pin plate 360. Thus, the compressed springs 350 upwardly urge the locking pin 330 into a release position within the housing 318 upon their return to a normal position.

As such, the locking mechanism 300 is attached to a shank 200 so as to allow the locking pin 330 in its normal position to extend between the aligned apertures of the respective shanks and connect the same. Upon user movement of the locking pin arm 370, the pin 350 is withdrawn from the aligned shank apertures so as to allow for release of the nested shanks.

Accordingly, my latching mechanisms 100, 200, 300, as above described, provided for a positive engagement and release of the drive shanks. As such, selectable lengths of drive tool shanks are provided.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. A latching mechanism adapted for coupling two nestable shanks in a selected extension therebetween, each shank having at least one aperture along a longitudinal extent thereof said latching mechanism comprising:

a housing;

an aperture in said housing;

a locking pin for extension through said aperture, said pin having first and second ends;

a pivot arm within said housing having first and second ends, said pivot arm first end being pivotable about an axis within said housing with said pivot arm second end attached to said locking pin;

first means for biasing said pivot arm to urge said locking pin second end towards a position within said housing;

a lever arm for bearing against said first end of said locking pin;

second means for biasing said lever arm to a first position bearing against said first end of said locking pin to urge said second end of said locking pin in extension outside said housing, said lever arm presenting a first end for user manipulation, a manipulation of said first end urging said lever arm away from said first position to allow said first bias means to urge said locking pin second end within said housing:

said latching mechanism adapted for placement along one of the shanks with an aperture of the respective nested shanks aligned therebetween, wherein said latching mechanism joins the shanks upon said movement of said locking pin second end in extension outside said housing and through the aligned apertures of the shanks, the nested shanks releasable upon movement of the locking pin second end towards said position within said housing and outside the aligned shank apertures.

2. The latching mechanism as claimed in claim 1 wherein said first bias means comprises a spring within said housing, a movement of said spring to a normal position biases said pivot arm wherein said second end of said locking pin is urged towards said position within said housing.

3. The latching mechanism as claimed in claim 2 wherein said second bias means comprises a spring within said housing, a movement of said second bias means spring towards a normal position urging said lever arm into said first position bearing against said first end of said locking pin.

4. The latching mechanism as claimed in claim 3 wherein said bias of said second bias means is greater than said first bias means on said locking pin, whereby to urge said second end of said locking pin outside said housing.

5. The latching mechanism as claimed in claim 1 wherein said second bias means comprises a spring within said housing, a movement of said second bias means spring towards a normal position urging said lever arm into said first position bearing against said first end of said locking pin.

6. A latching mechanism adapted for coupling two nestable shanks in a selected extension therebetween, each shank having at least one aperture along a longitudinal extent thereof, said latching mechanism comprising:

a housing:

a locking pin having a free end for extension outside said housing;

first means for biasing said free end of said locking pin towards a first normal locking position outside said housing, said first bias means comprising:

a first spring;

an arm associated with said first spring, said first spring urging said arm against said locking pin in manner to urge said free end of said locking pin outside said housing;

second means for biasing said free end of said locking pin towards a second release position within said housing;

said first bias means selectably operable by a user in a manner to remove said bias of said first bias means on said locking pin, whereby said second bias means urges said locking pin free end towards said second release position within said housing, a placement of said latching mechanism along the first shank with the second shank nested therein joining the first and second shanks upon said movement of said locking pin to said first normal locking position and in extension through aligned apertures of the first and second shanks, a user operation of said first bias means moving said locking pin to said second release position and outside the aligned apertures for releasing said joined shanks.

7. The latching mechanism as claimed in claim 6 wherein said second bias means comprises a second spring, said second spring associated with said locking pin in a manner to urge said locking pin towards said second release position.

\* \* \* \* \*